United States Patent [19]

Steutermann

[11] 4,327,705
[45] May 4, 1982

[54] SOLAR HEAT RECOVERY CONTROL

[76] Inventor: Edward M. Steutermann, 2800 First National Tower, Louisville, Ky. 40202

[21] Appl. No.: 90,265

[22] Filed: Nov. 1, 1979

[51] Int. Cl.$^3$ .................................................. F24J 3/02
[52] U.S. Cl. .................................... 126/422; 126/419
[58] Field of Search .............................. 126/419–422, 126/439, 440, 435, 415, 417

[56] References Cited

U.S. PATENT DOCUMENTS

| | | | |
|---|---|---|---|
| 3,994,279 | 11/1976 | Barak | 126/422 |
| 4,031,880 | 6/1977 | Devin | 126/419 |
| 4,153,955 | 5/1979 | Hinterberger | 126/422 |
| 4,184,481 | 1/1980 | Tornquist | 126/422 |

*Primary Examiner*—James C. Yeung
*Attorney, Agent, or Firm*—Edward M. Steutermann

[57] ABSTRACT

Flow control arrangement for use in a heating process utilizing multiple heat sources at different temperatures to transfer heat to a selected fluid circulated through the sources including at least one first heat source at a first temperature and having a fluid inlet means to receive the fluid and fluid outlet means adapted to emit the fluid, first valve means to control flow of fluid to the first heat source inlet, at least one second heat source at a second temperature having fluid inlet means to receive the fluid and fluid outlet means to emit the fluid, second valve means to control flow of fluid to the second heat source, a source of fluid adapted to supply the fluid to the first and second valve means, conduit means connecting the second heat source fluid outlet with the first valve, conduit means connecting the first heat source fluid outlet with the second valve means and controller means to actuate the first and second valve means and the source of fluid to direct fluid flow to one of the first and second heat sources at the lowest temperature then to the heat source with the highest temperature.

8 Claims, 12 Drawing Figures

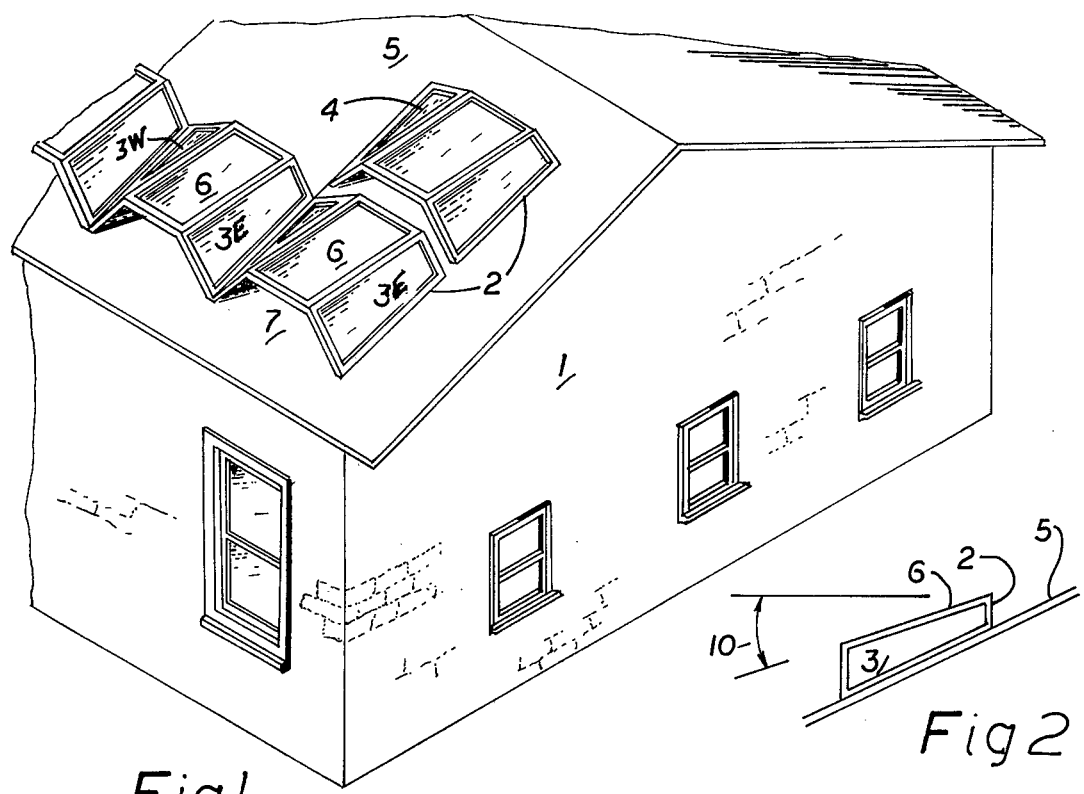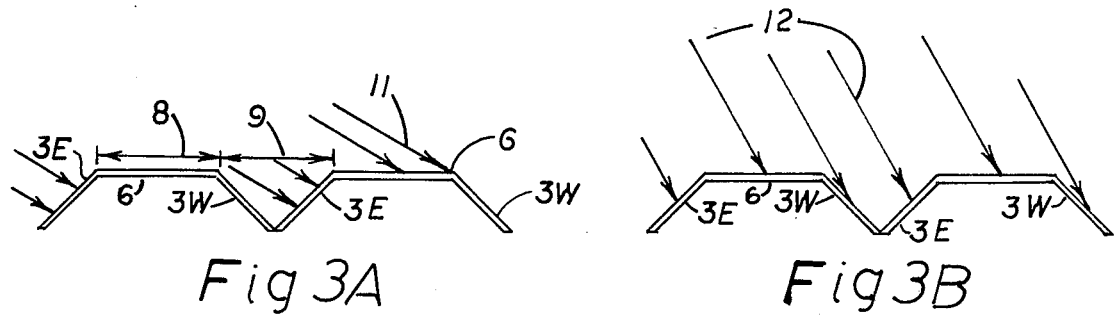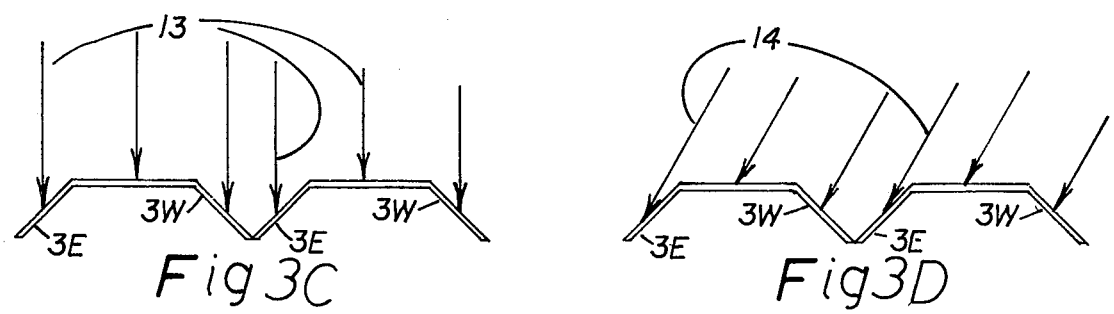

SOLAR HEAT RECOVERY CONTROL

BACKGROUND OF THE INVENTION

The present invention relates to a control mechanism for controlling the flow of a heat transfer fluid in heat transfer relation serially through a series of heat sources where the fluid flow is directed first through the lower temperature heat sources and finally to the higher temperature heat sources.

The present invention finds particular application in recovery of heat from solar energy receiving cells where multiple cells are set at different angles and attitudes relative to incident sunlight so that the different cells are heated to different temperatures depending upon the position of the sun relative to the cells. For example, the present invention finds application, for example in devices utilizing pyramidal-shaped solar panels where in many instances two panels receive energy from the sun but the angle of incidence is different on the two panels so that the panels are heated to different temperatures.

Without direction for the flow of heat transfer fluid through such pyramidal solar cells, the outlet temperature from the cell is the average of the effective heat transfer temperature of the two cells and therefore maximum temperature heat transfer fluid is not obtained.

In most prior art arrangements utilizing solar heat transfer, flat panels have been utilized where the panels have generally been located on, for example, a southward directed surface in the northern hemisphere and a northern directed surface in the southern hemisphere. In such arrangements the solar rays strike directly on the panel during a small portion of the day. During the majority of the day the solar rays strike the panel at an acute angle so the outlet temperature of the fluid from the panels varies during the day being the maximum at approximately the noon hour solar time, when the sun shines directly on the panel.

In previous arrangements utilizing multiple panels the order of flow through the panels have been fixed so such devices have not been capable of providing the maximum available heat necessary and equally as important maximum temperature in the heat transfer fluid for an extended portion of the day. The outlet temperature from such solar cells is particularly critical when the solar cell is utilized to provide heat to be stored for use at a later time, for example, during the nighttime or when the daytime skies are cloudy or where a maximum temperature is required such as in water distillation.

Prior art arrangements showing attempts to provide maximum solar energy are shown in several references, and the most pertinent known are discussed hereinafter.

U.S. Pat. Nos. 4,121,566; 4,015,584; 4,011,855; and 3,321,012 show various arrangements of fixed parabolic reflectors to receive solar energy and reflect the energy to a collector.

U.S. Pat. Nos. 3,996,917 and 3,884,217 illustrate arrangements which recognize the advantages of maximizing the period of direct incidence of solar radiation on the collector device but accomplish the objectives by mechanical means including a moveable reflector and drive means to cause the reflector to "track" the sun through its path.

Likewise, U.S. Pat. Nos. 4,121,566; 3,986,489; and 4,085,731 show devices which in one way or another operate in response to a change in temperature of a reference either the collector or the liquid utilized for heat transfer.

For example U.S. Pat. No. 4,121,566 teaches an arrangement where multiple parabolic reflectors are utilized and where the heat transfer fluid is withdrawn from a heat source only after it reached a preselected temperature.

Even where solar cells having a geometric design other than a flat plate have been utilized such devices are subject to the movement of the sun and no device is known to provide an arrangement to maximize the outlet temperature from multiple fixed solar heated panels to provide heat for storage or even for other purposes including the provision of fresh water from sea water.

SUMMARY OF THE INVENTION

The present invention provides an improved control arrangement for the use in applications including solar heating application where at least two different sources of heat are provided to heat a fluid and where the fluid is passed serially and selectively through the heat exchange sources. Briefly, the present invention provides an advantageous, economical straightforward arrangement to control the flow of heat transfer fluid first through the cooler of the heat sources and then through the warmer of the heat sources to optimize heat reception and maximizing temperature.

Devices in accordance with the present invention find useful application in the control of the heat transfer fluid through solar cells where the cells are disposed at different attitudes relative to the path of the sunlight so at least two of the solar panels are always exposed to, and heated by, the radiant energy of the sun.

In such applications, maximum heat transfer to the heat transfer fluid is achieved by heating the heat transfer fluid in the lower temperature solar cells and then providing a final heating in the solar cell exposed to the most direct rays of sunlight.

Prior art devices are known where similarly oriented flat solar panels or parabolic reflectors have been used to receive the radiant energy from the sun, to provide heat to a heat transfer medium and where the angle of incidence of the radiation from the sun strikes the panel at the optimum only for a short period during the day.

On the contrary, devices in accordance with the present invention provide a flow control arrangement for solar panel arrangements where the optimum angle of incidence occurs two or more times during the traverse of the sun across the sky each day.

More particularly, while the present invention can be utilized in other applications, it is particularly useful in solar heating devices for obtaining the maximum temperature and heat recovery possible from multiple heat sources disposed at different angles relative to the traverse of the sun to provide useful heat to heat storage arrangements. Further in some applications, it is possible to provide sufficient temperature in the heat transfer medium for example, where the heat transfer medium is ocean water, to provide for distillation or evaporation of water from the sea water and recovery of potable water.

More particularly, the present invention provides an arrangement including at least one first heat source means having a heat transfer medium passageway therethrough with first source fluid inlet means and a first source fluid outlet means, first heat source valve means adapted to control the flow of heat transfer medium through the first heat source, at least one second heat source means having a fluid heat transfer medium fluid flow passageway therethrough having a second source fluid inlet means and a second source fluid outlet means, second heat source valve means adapted to control flow of heat transfer medium through the second heat source, first heat source means fluid outlet conduit connected between the first heat source means outlet and the second heat source valve means and second heat source means fluid outlet conduit connected between the outlet of the second heat source and the first heat source valve means, flow controller means to operate said first heat source valve means and second heat source valve means so that heat transfer medium selectively flows from the heat transfer medium supply means to the first source fluid inlet means and from first source fluid outlet to the second source means fluid inlet means and through the second heat source means to the second source means fluid outlet means when the temperature of the second heat source means is greater than the temperature of the first heat source means and from the heat transfer medium supply means to the second source fluid inlet means and from the second source fluid outlet means to the first source fluid inlet means and through the first source heat transfer medium passageway means to the first source fluid outlet means when the temperature of the first heat source is greater than the temperature of the second heat source.

It will be recognized that the foregoing discussion and the description hereinafter provide only examples of arrangements within the scope of the present invention, are by way of illustration only, and that various other arrangements within the scope of the present invention will occur to those skilled in the art upon reading the disclosure set forth herein.

BRIEF DESCRIPTION OF THE DRAWINGS

Referring now to the accompanying drawings which illustrate various arrangements within the scope of the present invention:

FIG. 1 is a perspective view of a structure with solar collector panels within the scope of the present invention located in the roof; and FIG. 2 shows one example of one of the solar collector panels shown in FIG. 1 in elevational view; and FIGS. 3a-3e illustrates the incidence of solar radiation on the panels of FIG. 1 at various times of the day.

Figure 5:
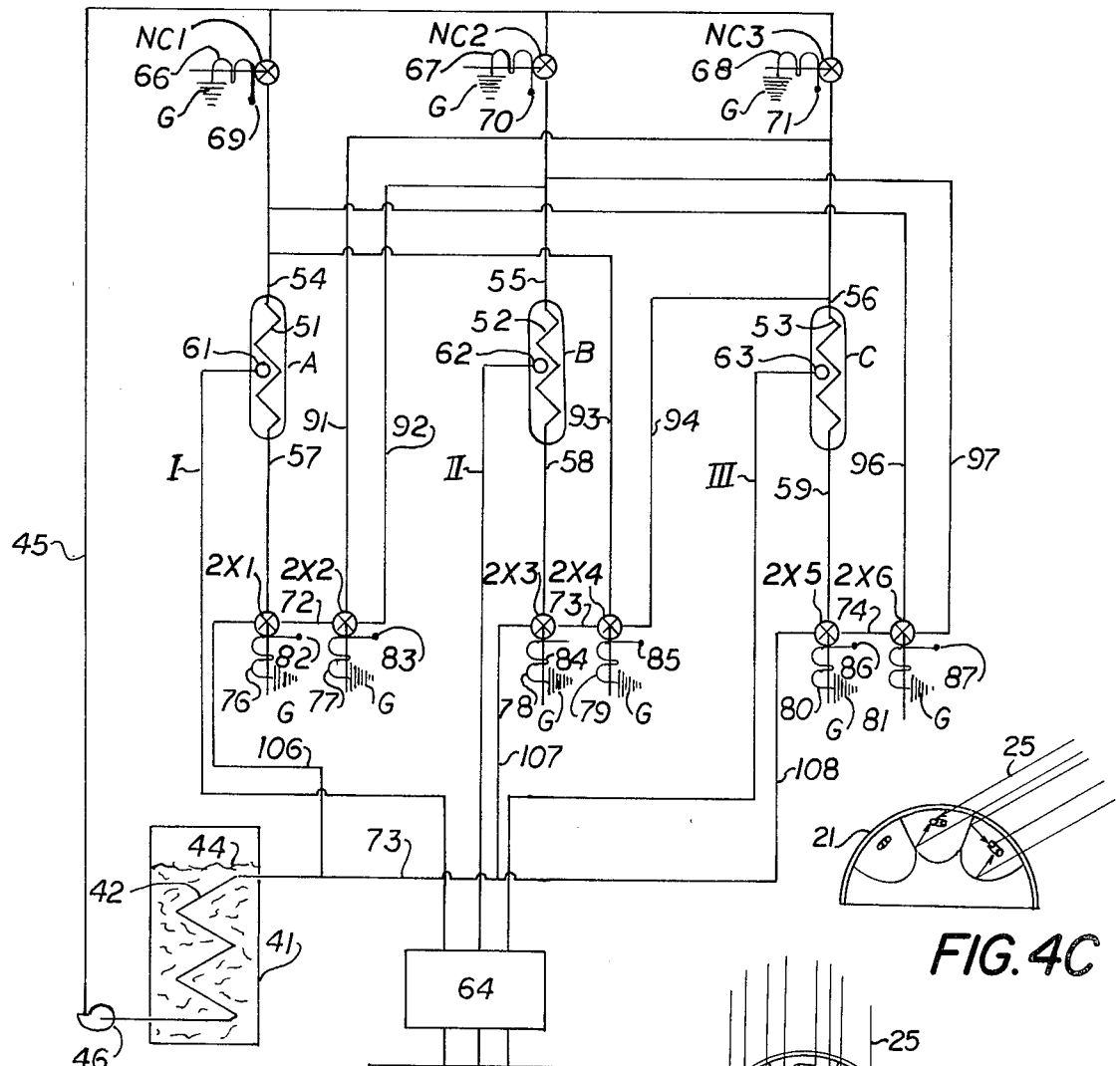
FIG. 5 is a schematic illustration of a control arrangement within the scope of the present invention.

Referring first to FIG. 1, an arrangement is shown where solar cells 2 are disposed on the roof 5 of a structure 1, for example a house. Each of the cells 2 includes an upper panel 6 and downwardly extending side panels 3E and 3W where it will be understood that panel 3E has an easterly exposure while panels 3W have a westerly exposure.

As shown, cells 2 define an open chamber 7 but can be closed if desired. As shown in FIG. 2, panels 6 are disposed at an angle 10 with respect to horizontal where angle 10 can be selected so that the plane of panel 6 is normal to the noon sun at selected times of the year to provide maximum radiation receipt.

Likewise panels 3E and 3W are disposed at selected angles below horizontal depending on design considerations and the selected period during the daily solar arc when it is desired that the solar rays strike the panels at the most direct angle.

Each of the panels 3E, 3W and 6 has a fluid flow conduit not shown, which can be interconnected as described hereinafter to remove heat from the panel where the heat results from inpingement of solar radiant energy on the panel and adsorbition of the energy by the panel.

Typically, such panels include a frame with the coil disposed therein and a transparent cover over the frame to admit radiant energy and prevent loss of heat by convection.

As shown in FIG. 3A the dimensions of the panels can be selectively varied depending on the application and desired performance.

In FIG. 3A panels 6 have a width 8 which can be in a selected ratio to the width 9 which is the horizontal projection of the width of panels 3E and 3W so that the relative quantities of heat received by the panels can be selected.

For example and referring to FIGS. 3A–3E, FIG. 3A represents early morning where solar rays 11 are at a relatively low angle relative to horizontal and strike panels 3E and 6 but not directly on panels 3W. It will be recognized that at certain angles of incidence of panels 3E and 3W portion of the incident radiant energy is reflected from the surface of the panel to the next adjacent panel to provide reflected energy to be received by the panel. The example shown in FIG. 3B, represents incidence of rays 12 at a later period when some radiation is received by panels 3W but the most direct radiation is received by panels 3E. In the circumstances shown in FIG. 3B, and in the absence of other modifying circumstances, it would be expected that the temperature of panels 3E would be the greatest followed by panels 6 and 3W. If the heat transfer medium were passed in fixed series through panels 3E, 6 and 3W the outlet temperature would be the weighted average. If the order of flow were 6, 3E then 3W it is possible that the heated fluid from panel 3E might actually lose heat in panel 3W.

In accordance with one feature of the present invention the heat transfer fluid would flow in the panels in the order 3W, 6, 3E. Thus some heat would be recovered from panel 3W and by emitting the fluid through panel 3E the maximum available ΔT is realized at the time shown.

FIG. 3C is an illustration of the systems at about solar noon where the solar rays 13 impinge directly on panels 6 and at an angle on panels 3W and 3E. Likewise FIG. 3D illustrates the incidence of early afternoon rays 14 on the panels while FIG. 3E illustrates the incidence of late afternoon rays 16 on the panels.

From the foregoing it can be seen that by proper orientation of the panels 3E, 6 and 3W and by controlling the sequence of flow of the heat transfer media through the panels, the heat recovery and final temperatures of the fluid can be maximized. Maximization of the outlet temperature is particularly important in arrangements where the heat is to be stored because the ΔT between the fluid and the storage facility is the primary determinant of the quantity of heat available for storage.

Figure 4C:
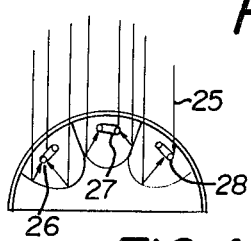
FIGS. 4a-c are cross sectional illustrations of another solar panel arrangement with the scope of the present invention.
Figure 4B:
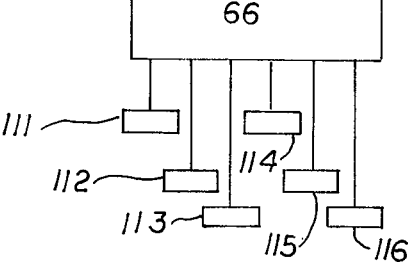
Figure 4A:
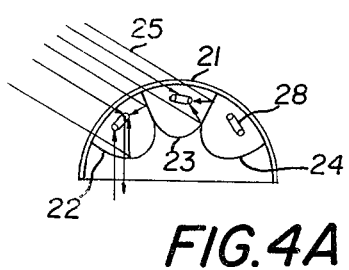

FIGS. 4A–4C shows a cross sectional view of an example of panel arrangement where a semi-cylindrical transparent cover 21 is provided to receive 3 parabolic reflectors 22–24 where coils 26–28 are located at the focus of the reflector to receive radiation from the reflectors. Rays 25 are provided in FIGS. 4A–4C to illustrate the relative radiation available to the reflectors 12–14 at early morning noon and late afternoon as previously discussed with respect to FIGS. 3A–3E.

Referring now to FIG. 5, a schematic diagram of one controlled flow arrangement within the scope of the present invention is shown, where three heat transfer devices, A, B and C for example as previously described where the devices are oriented with respect to incident sunlight so that the devices are heated to different temperature relationships during a typical day. Each of the heat transfer devices A–C is, respectively provided with a heat transfer fluid inlet 54–56 to, for example a coil 51–53 respectively to receive heat and transfer a portion of the heat to the fluid flowing in coils 51–53. Likewise each heat transfer devices A–C is provided with a heat transfer fluid outlet 57–59 for emission of heat transfer fluid.

Temperature sensors 61–63 are provided in each of the heat transfer devices A–C to measure the effective heat transfer temperature I–III respectively available at each heat transfer device as an indication of the maximum available heat transfer fluid outlet temperature. The location of the temperature sensors depends upon the characteristics of the heat source but can be located to provide the most effective measure of the temperature available at the heat source.

It will be understood that, within the scope of the present invention two or more heat transfer devices at different temperatures can be utilized but in the example shown, three are provided. Likewise numerous flow devices and assemblies can be provided within the scope of the present invention to conduct a heat transfer fluid first through the coolest heat transfer device serially to the warmest. However in the example shown, the objectives are accomplished by the use of two way valves. First, three solenoid operated normally closed valves NC1–NC3 are provided, in each inlet line, 54–56 respectively to each heat transfer device A–C. Each valve NC1–NC3 is provided with a solenoid coil 66–68 having one grounded terminal G and one power terminal 69–71 respectively, and each valve NC1–NC3 also communicates with outlet 45 from a pump 46 which is provided to circulate heat transfer fluid, for example brine through heat transfer devices A–C as described herein to warm the heat transfer fluid and through a coil 42 located in a reservoir 41 where the heat is transfered from the heat transfer fluid to, for example fluid 44 stored in reservior 41 for subsequent recovery of heat in other applications such as, for example, space heating. It will be recognized that such heat transfer to the fluid 44 occurs only if the temperature of the heat transfer fluid in coil 42 is in excess of the temperature of fluid 44 and that the rate of heat transfer and therefore the effective recovery of useable heat is likewise a function of the temperature difference.

Each outlet 57–59 of each heat transfer device A–C is provided with a two way valve 2x1, 2x3, 2x5 which selectively communicates with a second two way valve 2x2, 2x4, 2x6 by means of conduits 72–74 respectively, and with an exhaust manifold 73, by means of conduits 106–108, which supplies heat transfer fluid to coil 42 as described hereinafter. Each of the valves 2x1–2x6 is solenoid operated by a core coil 76–81 with a grounded terminal G and a power terminal 82–87.

Two way valves 2x2, 2x4, 2x6 communicate with the associated two way valves 2x1, 2x3, 2x5 to selectively supply heat transfer fluid to the two heat transfer devices with which they are not associated. For example valves 2x1 and 2x2 are associated with heat transfer device A and valve 2x2 communicate with heat exchange devices B and C by means of conduits 91 and 92 respectively. Likewise valve 2x4 communicates with valve 2x3 at the outlet of heat transfer device B and with inlets of heat transfer devices A and C by means of conduits 93 and 94. Additionally, valve 2x6 communicates with valve 2x5 at the outlet of heat transfer device C and with the inlets to heat transfer devices A and B by means of conduits 96 and 97.

The valves NC1–NC3 and 2x1–2x6 can, as shown, be solenoid operated to be programmed, for example as shown herein, to direct flow of heat transfer fluid through heat transfer devices A–C to provide a maximum temperature at the outlet of the warmest heat transfer device.

As shown, the temperature I–III are supplied to control devices 64–66 to control direction and order of flow of heat transfer fluid through heat transfer devices A–C as described hereinafter.

Figure 6:
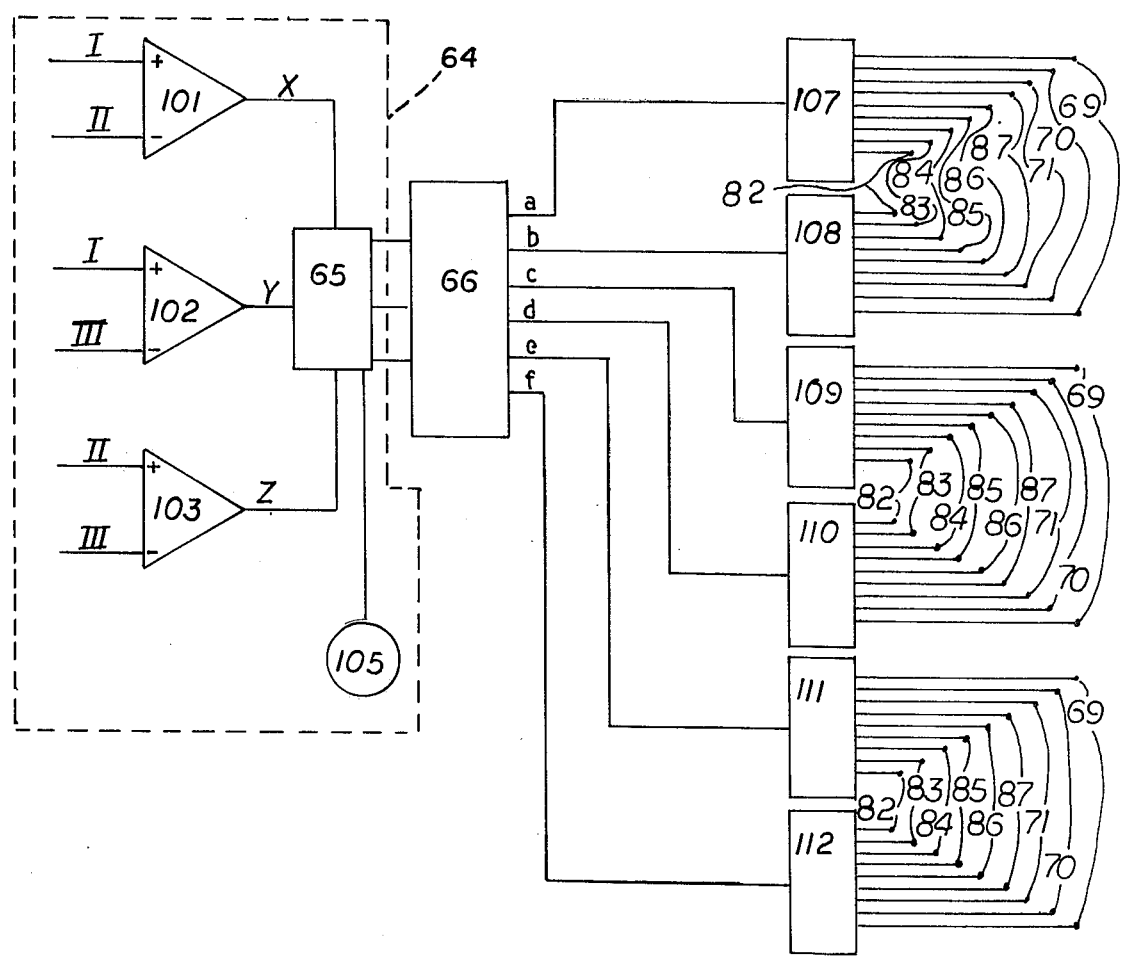
FIG. 6 is a schematic illustration of one arrangement useful in the control arrangement shown in FIG. 5.

While various means can be utilized to direct the order of flow of heat transfer fluid through heat transfer devices A–C, including manual control, the objectives of the present invention can be accomplished by various means, for example through means shown in FIG. 6.

In FIG. 6, an arrangement is shown where 3 comparators 101–103 for example a National SemiConductor LM-106, are shown, each having two inputs for comparison of input signals. The input signals are provided by the outputs I–III provided by temperature sensors 61–63 where the sensors may directly provide, or may be modified by means not shown but known in the art to provide, an electrical signal I–III directly proportional or indicative of the temperature and/or maximum heat transfer fluid temperature available in the heat transfer devices A–C.

In the example shown, comparators 101–103 are provided to convert the analog signals I–III to provide binary signals designated to binary signs 0 and 1 at the outputs X, Y and Z of comparators 101–103 depending on the relative value of inputs I–III and the characteristics of comparators 101–103. For example considering comparator 101 and assuming that the signals I–III provide higher voltage for higher temperature and lower voltage for lower temperatures, and that the temperature available from heat exchange device A is lower than available from heat exchange device B so it will be assumed that the signal II is higher than the signal I. It will also be assumed that the temperature of heat transfer device C is greater than the temperatures of heat transfer devices A and B so that the voltages of signal III is higher than I and II.

At comparator 101 signal II is connected to the terminal designated (−) while the lower signal I is converted to the (+) terminal. Briefly stated, the negative input is greater than the positive input so the signal at X is low or 0. Conversely where signal I is greater in magnitude than signal II the output X goes high, or 1.

Each comparator 101–103 thus provides a binary output signal dependant upon the relationship of the inputs, and the outputs X, Y and Z provide a binary number indicative of the totality of the relationships between the signals I II III. The relationship can be shown in summarized form in Table I, where the maximum heat effective transfer fluid temperatures at the heat sources A, B and C are shown as L, M and H, indicating lowest, middle and highest. Likewise, the outputs X, Y and Z of the comparators 101, 102 and 103 are shown in binary forms for modes a–f at different relative temperatures in the heat sources with the base 10 number shown to further illustrate the distinctiveness of the particular situation.

$$\text{Number of two point comparators} = \frac{n(n-1)}{2}$$

where n=the total number of heat transfer devices.

The optimum control sequences corresponding to the modes shown in FIG. 5 is shown in Table II where the modes shown in Table I are reflected as the direction of

TABLE I

| | ILLUSTRATION OF BINARY GENERATION OF COMPARATOR OUTPUT | | | | | | |
|---|---|---|---|---|---|---|---|
| MODE | RELATIVE HEAT TRANSFER DEVICE TEMPERATURE | | | COMPARATOR OUTPUT | | | DECIMAL BASE EQUIVALENT | DEVICE FLOW ORDER |
| | A | B | C | X | Y | Z | | |
| a | L | M | H | 0 | 0 | 0 | 0 | A-B-C |
| b | L | H | M | 0 | 0 | 1 | 1 | A-C-B |
| c | M | H | L | 0 | 1 | 1 | 3 | C-A-B |
| d | M | L | H | 1 | 0 | 0 | 4 | B-A-C |
| e | H | L | M | 1 | 0 | 1 | 5 | B-C-A |
| f | H | M | L | 1 | 1 | 1 | 7 | C-B-A |

As shown in FIG. 5 the binary inputs X,Y and Z are fluid flow in valves NC1–NC2 and 2x1–2x6.

TABLE II

| | | | | VALVE SETTINGS | | | | | |
|---|---|---|---|---|---|---|---|---|---|
| MODE | NC1 | NC2 | NC3 | 2 × 1 | 2 × 2 | 2 × 3 | 2 × 4 | 2 × 5 | 2 × 6 |
| | | | | OPEN TO | | | | | |
| a | O* | C* | C | 2 × 2 | B(in)* | 2 × 4 | C(in) | Ex | — |
| b | O | C | C | 2 × 2 | C(in) | Ex | — | 2 × 6 | B(in) |
| c | C | C | O | 2 × 2 | B(in) | Ex | — | 2 × 6 | A(in) |
| d | C | O | C | 2 × 2 | C(in) | 2 × 4 | A(in) | Ex | — |
| e | C | O | C | Ex* | — | 2 × 4 | C(in) | 2 × 6 | A(in) |
| f | C | C | O | Ex | — | 2 × 4 | A(in) | 2 × 6 | B(in) |

Ex = Exhaust Conduit 73
(in) = inlet to Heat Transfer devices A, B and C.
C = Closed
O = Opened provided to a latch 65 for example a Motorola MC14174B hex type D flip-flop which is selectively and periodically actuated by pulses from clock 105 to transfer the binary input X,Y, and Z to a device to convert the code to useful means for example, a binary coded decimal to 6 segment decoder 107, hereinafter referred to as BCD decoder 107. BCD decoder 107 provides 6 outputs a–f each corresponding to modes a–f each actuated in response to one of the comparator binary output combinations a–f shown in Table I so that for any of the Modes a–f shown in Table I one of the outputs a–f is actuated.

In the example within the scope of the present invention shown in FIG. 6, each output a–f is utilized as an actuator for preprogrammed relay 107–112 when each preprogrammed relay is supplied with a source of power, not shown, and each preprogrammed relay 107–112 is adapted to selectively provide power to selected terminals 69–71, 82–87 of relays 66–68, 76–81 of valves NC1–NC3 and 2x1–2x6 respectively so that each preprogrammed relay 107–112 actuates each valve combination differently to provide selected flow patterns through heat transfer devices A–C depending on the temperature relationship of the heat transfer devices.

It has been found that arrangements within the scope of the present invention can include any number of heat transfer devices and that where binary system control systems is utilized the number of comparators required to equal to:

By the foregoing means, the flow order of heat transfer fluid through the device can be selected to provide maximum output temperature in the heat transfer fluid.

It will be understood that the foregoing is but one example of an arrangement within the scope of the present invention and that various other arrangements and devices within the scope of the present invention will occur to those skilled in the art upon reading the disclosure set forth hereinbefore.

I claim:

1. A heat transfer arrangement to transfer heat to a heat transfer fluid to be heated including:
   (a) at least one first heat source means having first fluid passage means therethrough with said first passage means having first fluid inlet means and first heat source heat transfer fluid outlet means;
   (b) first valve means for controlling the flow of heat transfer fluid to said first fluid inlet means and through said first fluid passage means;
   (c) at least one second heat source means having second fluid passage means therethrough with said second passage means having second fluid inlet means and second fluid outlet means;
   (d) second valve means for controlling flow of heat transfer fluid to said second fluid inlet means and through said second fluid passage means;
   (e) first fluid bypass conduit means connected between said first fluid outlet means and said second valve means;
   (f) second fluid bypass conduit means connected between said second fluid outlet means and said first valve means;

(g) source of heat transfer fluid to selectively supply heat transfer fluid to at least one of said first and second valve means;

(h) first and second temperature measure means to determine the effective heat transfer temperature available at each of said first and second heat source means and provide first and second temperature signals;

(i) heat transfer fluid flow control means responsive to said first and second temperature signals to operate said first valve means and second valve means so heat transfer fluid selectively flows from said source of heat transfer fluid to the one of said first and second heat source means at the lowest effective heat transfer temperature then to one of said first and second heat source means having the higher effective heat transfer temperature;

(j) output conduit means to selectively withdraw heat transfer fluid from at least one of said first and second fluid outlet means.

2. The invention of claim 1 wherein at least one of said first and at least one of said second heat source means are adapted to receive solar radiant energy and transfer a portion of said received radiant energy to said heat transfer fluid flowing in said fluid passage means where said first and second heat source means are oriented at different relative angles to receive most direct solar rays at different times of the day.

3. The invention of claim 1 including:
  (a) at least one third heat source means having third fluid passage means therethrough with said third passage means having third fluid inlet means and third fluid outlet means;
  (b) third valve means for controlling the flow of heat transfer fluid to said third fluid inlet means and through said third fluid passage means;
  (c) third fluid bypass conduit means connected between said third fluid outlet means and said first and second valve means;
  (d) connector conduit means connecting said first and second fluid outlet means to said third valve means;
  (e) third temperature measure means to determine the effective heat transfer temperature available at each of said first, second and third heat sources and provide first, second and third temperature signals;
  (f) heat transfer fluid control means to operate said first valve means, said second valve means and said third valve means so said heat transfer fluid selectively flows from said source of heat transfer fluid to one of said first, second and third heat source means at the lowest effective heat transfer temperature then to one of said first, second and third heat source means at the next highest effective heat transfer temperature then to one of said first, second and third heat source means at the highest effective heat transfer temperature;
  (g) output conduit means to selectively withdraw heated heat transfer fluid from at least one of said first and second fluid outlet means.

4. The invention of claim 1 wherein said heat transfer fluid flow control means includes comparator means to compare the first and second temperature signals and provide an output signal indicative of which said first and second heat source means is at higher temperature and valve control operator means to receive said output signal operate said heat transfer fluid flow control means in response to said output signal.

5. The invention of claim 3 wherein said heat transfer fluid control means includes first, second and third comparator means each to compare selected pairs of the first, second and third temperature signals to provide a binary output signal from each comparator means determined by the relative relationship between each temperature signal pairs, decoder means to receive said binary output signal from said first, second and third comparator means and valve control operator means operated by said decoder means to operate said heat transfer fluid control to operate said first, second and third valve means.

6. A heat transfer arrangement to transfer heat to heat transfer fluid to be heated including:
  (a) A multiplicity of heat source means each having fluid passageway means therethrough each with fluid inlet means and fluid outlet means communicating with said fluid passageway means;
  (b) valve means for each said heat source means to control flow of heat transfer fluid to the associated fluid inlet;
  (c) bypass conduit means communicatively interconnecting the fluid outlet means of each heat source with the inlet valve means of each other heat source;
  (d) source of heat transfer fluid to selectively supply heat transfer fluid to at least one of said valve means;
  (e) temperature measure means to determine the effective heat transfer temperature available at each of said heat sources means and provide a temperature signal indicative of the temperature of each heat source;
  (f) heat transfer fluid flow control means to operate said valve means to direct flow of heat transfer fluid through said heat source means in series flow from the heat source having the lowest effective heat transfer temperature to the heat source having the highest effective heat transfer temperature.

7. The invention of claim 6 wherein said heat transfer fluid flow control means includes a number of comparator means at least equal to $n(n-1)/2$ where n is the number of heat source means and where each comparator means is adapted to compare the temperature signal of said heat sources in pairs and provide a binary output signal determined by the relationship between the compared temperature signals and decoder means to receive said binary output signals from all of said comparator means and valve operator means to receive said and control said valve means.

8. The invention of claim 7 wherein said heat source means are adapted to receive solar radiant energy and transfer a portion of said received radiant energy to said heat transfer fluid flowing in said passage means where at least two of said heat sources are oriented at different angles to receive most direct solar rays at different times of the day.

* * * * *